UNITED STATES PATENT OFFICE.

PAUL L. T. HÉROULT, OF NEW YORK, N. Y.

PROCESS OF PRODUCING DEPHOSPHORIZED HIGH-GRADE PIG-IRON.

1,172,597.     Specification of Letters Patent.     Patented Feb. 22, 1916.

No Drawing.     Application filed July 30, 1912. Serial No. 712,258.

*To all whom it may concern:*

Be it known that I, PAUL L. T. HÉROULT, a citizen of the Republic of France, residing in New York city, New York, have invented certain new and useful Improvements in Processes of Producing Dephosphorized, High-Grade Pig-Iron, of which the following is a specification.

This invention aims to provide a process by which there may be obtained a pig iron which is substantially free from phosphorus and sulfur and is otherwise adapted for the special purposes for which pig iron of high grade is now required; the product being obtained from ore containing a considerable percentage of phosphorus. I propose to make such product at a comparatively low cost and of great purity and uniformity by first making ordinary pig iron from phosphoric ore in a blast furnace as usual and transferring it therefrom, or from a mixer or cupola, in a molten state to an electric furnace and there treating it with proper slags and regulation of temperature and in a non-oxidizing atmosphere, so as to dephosphorize to the desired extent. When the molten pig iron is first introduced into the electric furnace a basic slag, containing as much lime as possible, and containing also some oxid of iron is applied to the bath, and the current is regulated so as to maintain a low temperature, just sufficient to keep the slag molten and to cause the same to combine with the silicon and phosphorus in the bath, leaving the carbon content of the metal practically unchanged, or only slightly reduced. When the dephosphorization has proceeded to the desired extent, the first slag is removed and a second slag is substituted consisting for example of lime and fluorspar with coke dust added. This second slag is very basic and practically free from oxid of iron. The effect is to remove all, or practically all of the sulfur. Thus the product obtained from a phosphoric ore is a dephosphorized and desulfurized pig iron of the finset quality which is obtained at an expense considerably less than is involved in the obtaining of a similar pig iron by other processes.

The electric furnace may be of any suitable type the Héroult arc type being preferred. It may be a tilting furnace or a stationary furnace fed by an intermittent or a continuous flow of the iron from the blast furnace or mixer, or cupola, and tapped to remove the refined iron as desired. The lining of the furnace should be basic. Carbon may be added in the electric furnace if desired, and various other known or suitable additions may be made.

What I claim is:

The process of refining phosphoric blast furnace pig iron which consists in treating it in an electric furnace in a non-oxidizing atmosphere with a basic slag containing oxid of iron at a temperature just sufficient to keep the slag molten and to cause it to combine with the phosphorus in the bath and to leave the carbon practically unchanged.

In witness whereof, I have hereunto signed my name in the presence of two subscribing witnesses.

PAUL L. T. HÉROULT.

Witnesses:
   DONALD FRASER CAMPBELL,
   A. H. GRAF, Jr.